Aug. 21, 1945.     W. S. BARNES     2,383,234
SOLAR WATER STILL
Filed April 29, 1942     2 Sheets-Sheet 1

INVENTOR.
WILLIAM SPEIGHT BARNES
BY Van Deventer & Grier
ATTORNEYS.

Aug. 21, 1945.　　　W. S. BARNES　　　2,383,234
SOLAR WATER STILL
Filed April 29, 1942　　　2 Sheets-Sheet 2
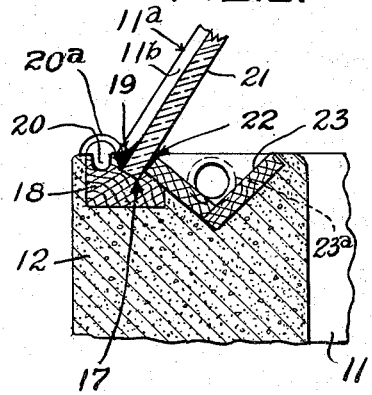
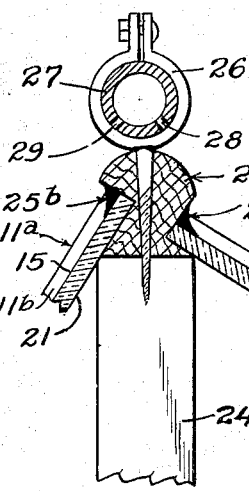
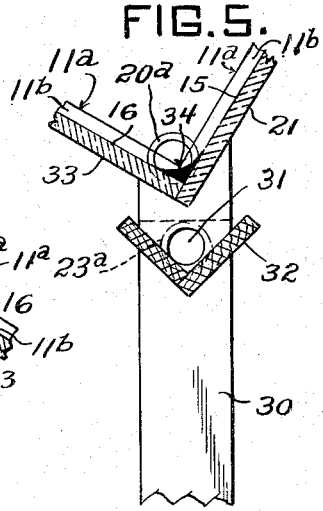
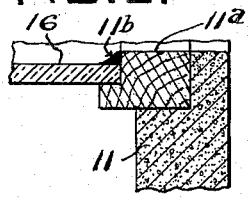
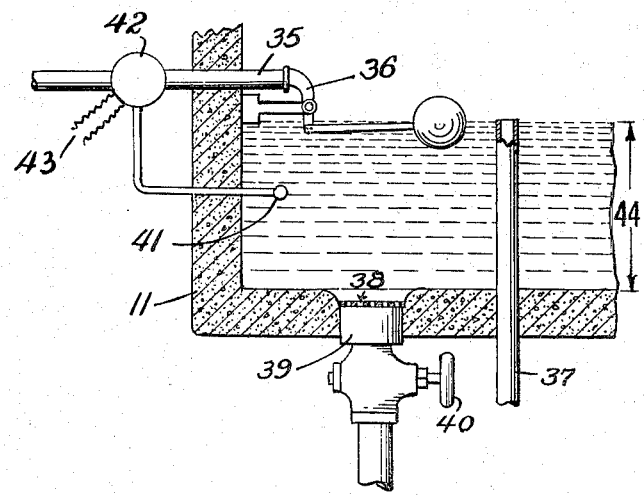
INVENTOR.
WILLIAM SPEIGHT BARNES
BY Van Deventer & Grier
ATTORNEYS.

Patented Aug. 21, 1945

2,383,234

UNITED STATES PATENT OFFICE 2,383,234

SOLAR WATER STILL

William Speight Barnes, Tucson, Ariz.

Application April 29, 1942, Serial No. 440,951

2 Claims. (Cl. 202—234)

This invention relates to improvements in solar water stills and has for an object the construction of such stills out of easily obtainable materials that are cheap and can be readily assembled without expert labor by the average workman.

Another object is to provide a still of the character described for use where fresh water is not readily obtainable and where no fuel is needed for the operation of the still.

Another object is to provide a means in a still of the character described, of maintaining a constant water level for the raw water to be distilled, and for thermostatically controlling the amount of raw water admitted to the still from time to time during the operation thereof dependent on the temperature of the air or water within the still.

A further object is to provide a still that will successfully yield fresh water distillate from salt water.

Another object is to provide a solar still of the character described having provision for catching rain water falling on the outer surface of the still.

Other objects and advantages will be apparent from the following specification which, taken together with the accompanying drawings, discloses a preferred embodiment of the invention.

While the invention is shown in one form, it will be obvious to those skilled in the art that it is not so limited but is susceptible to various changes and modifications without departing from the spirit thereof. It is desired, therefore, that only such limitations should be imposed thereon or as are specifically set forth in the appended claims.

In the accompanying drawings:

Figure 3 is a sectional view on the line 3—3 of Figure 1;

Figure 4 is a sectional view on the line 4—4 of Figure 1;

Figure 5 is a sectional view on the line 5—5 of Figure 1;

Figure 6 is a sectional view on the line 6—6 of Figure 1; and

Figure 7 is a diagrammatic view of the means for controlling the supply of raw water to the still.

The still comprises a water-tight base portion and a glass cover therefor.

Figure 1:
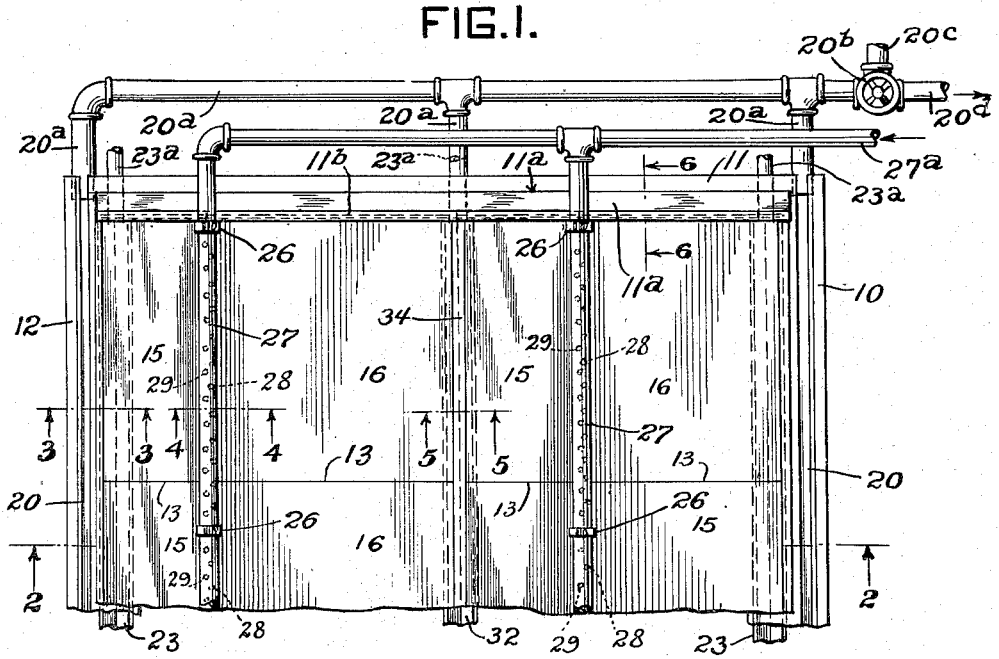
Figure 1 is a plan view of a solar water still embodying the invention.

The base portion may be any form of receptacle adapted to contain water, or it may be made up of the front and rear walls 10 and 12, respectively, and the side walls, one of which is shown at 11, in Figure 1, and a bottom or base 14 which, in the case of a still of the non-portable type can be made of concrete, brick, or earth, preferably covered with a thin layer of asphalt or other black heat-absorbing material on the inside. If desired, the base can be made of wood suitably treated in any manner to be water-proof.

Figure 2:
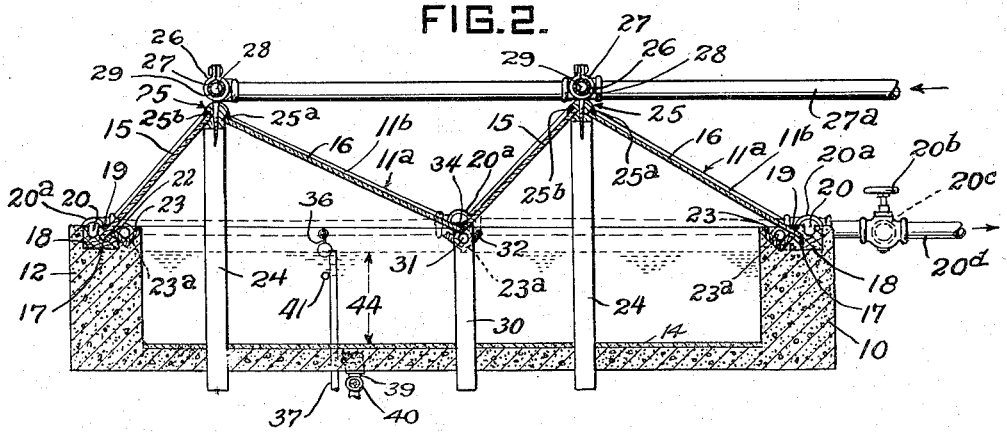
Figure 2 is a sectional view on the line 2—2 of Figure 1.

In Figure 2 the various supports for the glass cover are shown extending through the bottom 14 of the base portion which would be the manner of construction for a non-portable still. If, however, the still is to be portable, these supports would rest upon and be secured to the bottom 14 thereof in any suitable manner and would not extend therethrough.

The glass cover portion of the still which covers and encloses the open top of the base portion is of saw-tooth construction as shown in Figure 2. As these stills are usually set up with the wall 10 facing the south, the back glasses such as 15 face the north, and their surfaces are about parallel to the sun's rays on March 21st and September 23rd at noon. The angle of the front glass is such that its surface is substantially at a right angle to the maximum sun's rays, the exact angle of the front glass being dependent upon the latitude in which the still is used. In the latitude of Tucson, Arizona, the angle of the front glass with the horizontal may be fixed anywhere between thirty to thirty-five degrees, in which position the condensate or distilled water will run down the underside of the glass and into the troughs, hereafter mentioned, without dropping into the water reservoir.

Starting at the rear or north wall 12, the lower edge of the back glass 15 is supported thereon as shown in Figure 3, which also shows how the lower edge of the front glass 16 is supported on the front or south wall 10 of the device.

Referring to Figure 3, the lower edge 17 of the glass may set in a groove or slot in the concrete wall 12, being imbedded in said groove or slot in asphalt, putty, or the like, to form a waterproof joint which is slightly expansible to allow for the contraction and expansion of the glass and other parts while maintaining its water seal. But, a preferred arrangement as shown in the figure is to provide a grooved wooden seat 18 to support the glass, the small triangular space 19 in the slot being filled with putty, asphalt, or the like, to form a tight seal at this point. This seat may also have therein a gutter 20 for a purpose hereinafter described.

The inner surface 21 of the glass 15 on which the condensate collects when the still is in operation is in close contact with the upper edge 22 of a trough 23, which is supported on the wall 12 as shown. Therefore, any condensate collecting on the surface 21 will collect in the trough 23, which may be slanted towards one of the end walls such as 11 so that the condensate formed in all of the troughs in the device, such as 23, will be collected in a pipe 23ª and carried to a suitable container for the condensate or distilled water.

The gutters 20 also slope in the direction of one of the end walls, such as 11, so that rain water falling on the outer surface of the glasses 15 will be conducted in a pipe 20ª connected to all of these gutters to a suitable reservoir, thereby enabling this rain water to be saved for use.

Gutters 34, located between the glasses 15, 16, where the lower ends join, slope in the same direction as the gutters 20 and connect to the same pipe 20ª so that they too discharge rain water into the said pipe. When the cooling spray system, to be presently described, is used, these gutters 20 and 34 may carry off via pipe 20ª the water used for cooling, in which event the valve 20ᵇ may be operated to discharge the pipe 20ª through the waste pipe 20ᶜ instead of through the pipe 20ᵈ, connected to the rain water storage.

The back glasses 15 and the front glasses 16 are supported at their upper ends on suitable posts 24 which are provided at their upper ends with a wooden or other member 25 which is grooved or slotted, as shown, to receive the upper edges of the glasses 15, 16. It will be understood that the member 25 extends transversely between the side walls, being supported at suitable intervals by the posts 24. The members 25 may be held to the posts 24 in any suitable manner, or by means of a plurality of screw rings 26, which carry the sprinkler pipes 27, which are drilled, as indicated at 28, 29, so that when these pipes are connected to a water supply, such as the common pipe 27ª the water may be discharged over the glasses 15, 16 in fine sprays or streams, finding its way via gutters 20 and 34 and pipe 20ª to the discharge pipe 20ᶜ, as previously described. This spray cools the condensate adhering to the undersides 21 and 33 of the glasses 15, 16, thereby increasing the temperature difference between the inside and outside of the still and thereby increasing the yield of condensate. The glasses 15, 16 may be sealed into the member 25 in any suitable way using ordinary glazier's points and suitable sealing material, such as asphalt, putty, and the like, at 25ª and 25ᵇ.

The lower ends of the glasses 15, 16 are supported, as shown in Figure 5, as they terminate on posts 30, which are notched or grooved to receive them. The posts have a transverse hole 31 extending therethrough to form an open channel between the side walls and is slanted towards one of them. Between the posts is placed a trough 32 so that the condensate dripping off the inside surfaces 21 of 15, and 33 of 16 will drop into the trough 32 which, together with the communicating holes 31, form a channel or pathway for the condensate directing it, for example, to one side 11 of the still where this condensate joins that collected by the troughs 23 and is conducted by pipes 23ª or other means to the storage reservoir, not shown.

It will be observed that the troughs 23 and 32 may be of the same construction; that is, each made of wood or other suitable material and may be of any suitable length and can then be cut to fit the particular installation.

It will be evident that the side walls such as 11 may be of zig-zag or saw-tooth formation conforming to the angles of the glasses 15, 16. Referring to Figure 6, it will be seen that the glasses may extend to a support such as 11ª, which may be of wood secured to the side walls. The glasses are held in the support 11ª by the usual glazier's points or by putty or asphalt as indicated at 11ᵇ, so that these strips 11ª together with the strips 25 and the sealing arrangement previously described, completely seal the glass cover to the base portion of the still in water-tight relationship so that outside air and moisture cannot get into the still and the condensate cannot escape therefrom.

In Figure 7 is shown a suitable means for maintaining the level of the raw water in the base portion of the device. In this figure the water level is indicated at 44 and an inlet pipe 35 is provided passing through a wall such as 11 of the base portion. A suitable float-operated valve generally indicated by the numeral 36 is provided on the inlet pipe 35. When the water level 44 is lowered to a predetermined point, depending on the setting of the float valve, water will be admitted via valve 36 until the water level is restored. An overflow pipe 37 is provided to prevent the water level exceeding a predetermined height in the event of failure of the valve 36. A sump 38 is provided in the bottom 14 of the base portion which connects with a drain pipe 39 controlled by a suitable valve 40, whereby the raw water may be drained out of the base portion together with sediment and the like.

If desired, to thermostatically control the admission of water to the base portion, a thermostat 41 may be located within the raw water or within the air space above the raw water and within the still, and this thermostat may be set to control the admission valve 42 in the inlet pipe 35, valve 42 being operated in the usual way from a suitable electric circuit 43. As the construction and operation of such thermostatically controled valves is well known it will not be described in detail. Where the lateral edges of the glass panes come together as indicated at 13, Figure 1, any suitable means for sealing them, such as the usual lead sealing strip employed in greenhouses may be used. For small stills single panes of glass would be used at 15 and 16, but where the stills are wider than approximately two feet, it is desirable to use panes not over two feet wide, or panes of other standard sizes, and then it becomes necessary to employ some sealing means between the adjacent edges of the panes. Any suitable means may be employed.

A still constructed in accordance with the foregoing specification will have a sufficient yield per square foot of horizontal surface to give a satisfactory yield throughout the year that will make it economical and efficient to use as compared with the cost price of the usual steam heated water still. Because of the simplicity and cheapness of construction these stills may be used by filling stations and others in isolated sections where distilled water is difficult to obtain and where more expensive stills employing artificial heat are not suitable. The improved stills herein disclosed require no attention except an occasional cleaning of the base portion to remove sediment and the like, and an occasional cleaning of the outer surfaces of the glasses 15, 16.

The operation of solar stills being well understood and self-evident from the drawings, a description of the operation of the still herein disclosed will not be described in detail. While the drawings, Figures 1 and 2 show a still that may be approximately four feet in width, it will be understood that by adding additional panes of glass and constructing the framework as herein described, a still of any width and length, depending upon requirements, can be constructed by merely duplicating the construction herein shown and described.

It will also be observed that the lower ends of the glasses 15, 16, supported as shown in Figure 5 on the posts 30 may be further supported between the said posts by transverse members notched same as the posts and extending from one side of the still to the other same as the wooden members 25 which extend laterally over the posts 24. Other modifications in the details of construction may be made without departing from the combinations set forth in the appended claims.

Two things must be considered in fixing the angles of the front glass 16 and back glass 15 with the horizontal.

First, the slope of the glasses must be sufficiently great for the condensate to run into the troughs or gutters 23 and 32 instead of dropping off the underside of the glasses into the raw water. A slop of 20° is more than sufficient in this respect.

Secondly, the sun's rays should strike the front glass 16 at such an angle that practically all of the rays go through the glass into the water with little or no reflection from the outer surface of the front glass. If the rays are perpendicular to the surface of the front glass there is no reflection. If the rays make an angle of 10° to 20°, much of the solar energy is reflected upwards and is lost.

Rays reflected from the back glass are reflected down and pass through the next adjacent front glass to the north and are not lost.

The dates of March 21st and September 23rd, given herein, are the spring and fall equinoxes, when the sun is directly over the Equator. Such days give approximately the average position of the sun.

In the Southern Hemisphere, in Australia for instance, the back glass 15 would face the south.

At and near the Equator both the front and back glass would make the same angle with the horizontal in order to avoid losing rays by upward reflection. In other words, the slopes of the glasses should be fixed at such an angle in any latitude that the upward reflection of the sun's rays will be reduced to a minimum, the exact angle of course being determined by the latitude.

What is claimed is:

1. In a solar distilling apparatus, a raw water receptacle having watertight walls, a sheet of transparent material having its lower edge supported by one of said walls whereby same is permanently secured in watertight relation thereto, said sheet extending upwards from said wall at an angle so as to overlie the water surface of said receptacle, an apex support for the upper edge of said sheet secured to said receptacle, a second sheet having its upper edge secured to said support and extending downwardly at an angle and overlying the water surface of said receptacle, a bottom support for the bottom edge of said second sheet, means enclosed by said sheets and walls for collecting condensate formed on the underside of said sheets and delivering said condensate to a point outside said still, and a sprinkler pipe mounted on said apex support above the apex of said sheets whereby water may be delivered to the outer surface of both said sheets to cool the condensate formed on the inner surfaces thereof.

2. In a solar distilling apparatus having a raw water receptacle having watertight walls and a transparent covering therefor comprised of flat sheets, means for supporting said sheets in sawtooth formation over the raw water surface of said receptacle including two sets of posts extending upwards from the bottom of said receptacle, one set of posts being shorter than the other, said shorter posts supporting the lower opposed edges of said sheets and said longer posts supporting the upper opposed edges of said sheets, means carried by said shorter posts for collecting condensate from the underside of all said sheets, and sprinkler pipes mounted on said longer posts and adapted to deliver water to the outside surfaces of said sheets.

WILLIAM SPEIGHT BARNES.